(12) United States Patent
Dovi

(10) Patent No.: US 6,574,716 B2
(45) Date of Patent: Jun. 3, 2003

(54) UNIFYING DATA STORAGE IN A DISTRIBUTED NETWORK

(75) Inventor: Mark A. Dovi, Sherwood, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 97 days.

(21) Appl. No.: 09/866,735

(22) Filed: May 30, 2001

(65) Prior Publication Data

US 2002/0184451 A1 Dec. 5, 2002

(51) Int. Cl.[7] .............................................. G06F 12/00
(52) U.S. Cl. ...................................... 711/147; 709/213
(58) Field of Search ................................ 711/148, 147; 709/213–216, 231–232; 717/11; 713/201; 380/25

(56) References Cited

U.S. PATENT DOCUMENTS 5,901,228 A * 5/1999 Crawford ..................... 380/25
5,991,809 A * 11/1999 Kriegsman .................. 709/226
6,360,364 B1 * 3/2002 Chen et al. .................... 717/11
6,374,357 B1 * 4/2002 Mohammed et al. ....... 713/201

* cited by examiner

Primary Examiner—Do Hyun Yoo
Assistant Examiner—Nasser Moazzami

(57) ABSTRACT

A system and a method provides for flexible storage of digital data in a networked-computer system by unifying distribute data storage locations. The system and method allow an e-application operating at a network site, such as an Internet Web site, to utilize distributed storage devices that reside at remote client locations for storing data resulting from execution of the e-application. In an embodiment, the system includes a storage proxy and registry that attempts to "discover" storage at the e-application site or at the remote client locations. The storage proxy and registry may use various routines and algorithms to determine where data should be stored. Alternatively, the system may use a default storage location. In this alternative, the system may require the remote client location to store all or part of the data associated with the e-application.

20 Claims, 3 Drawing Sheets

UNIFYING DATA STORAGE IN A DISTRIBUTED NETWORK

TECHNICAL FIELD

The technical field is the storage of data in networked computer systems.

BACKGROUND

Internet applications may require the storage of extremely large quantities of data. One architecture in use today to support this storage problem is a disk farm. A disk farm may be a large number of servers, having thousands of linked storage devices for storing digital data. A representative storage device is an optical disk. The disk farm may be coupled to data collection and processing systems that collect data over the Internet, possibly process the data to convert the data into a format suitable for storage, and then store the data in the disk farm. U.S. Pat. No. 5,860,068 to Cook describes a disk farm that is used to store hundreds of thousands of sound recordings.

While disk farms may provide the required digital data storage capacity, such disk farms may be expensive to build and maintain, and unless the actual storage of digital data is close to the capacity of the disk farm, the excess capacity may represent a significant waste of resources. Disk farms may also run out of storage capacity, and adding additional storage is expensive. Disk farms require some form of storage management to ensure that files are properly allocated to storage devices. This storage management function requires additional programming. Finally, transfer of large data files over a network such as the Internet may impose transmission delays when the network bandwidth is exceeded. In summary, disk farms do not represent a flexible storage solution for storing data for Internet-related applications.

SUMMARY

A system and a method provides for flexible storage of digital data in a networked-computer system by unifying data storage. The system and method allow an e-application operating at a network site, such as an Internet Web site, to utilize distributed storage devices that reside at remote client locations for storing data resulting from execution of the e-application. In an embodiment, the system includes a storage proxy/registry that attempts to "discover" storage at the e-application site or at the remote client locations. The storage proxy/registry may use various routines and algorithms to determine where data should be stored. Alternatively, the system may use a default storage location. In this alternative, the system may require the remote client location to store all or part of the data associated with the e-application.

The storage proxy/registry also serves to register a particular client with the system 10 so that data files are properly and securely accessed only by the intended client.

DETAILED DESCRIPTION

Current Internet applications may require massive amounts of data storage capacity. Such capacity may be provided at a first storage location (e.g., a disk farm or a server-related storage device), that is coupled to, or related to the Internet application. That is, the Internet application may have its own dedicated disk farm, or may use a central disk farm that serves many different Internet applications. Also coupled to the Internet application may be one or more client machines that comprise a distributed storage system. The client machines may comprise a personal computer and a second storage device, such as a hard drive incorporated into or attached to the personal computer, or other storage devices such as optical disk storage systems, for example.

To take advantage of the distributed storage systems (i.e., the personal computers and associated second storage devices) and the first storage system (e.g., a disk farm or a server related storage device), a system and a method monitor applications executed at an Internet site and at client machines, and optimize data storage by storing data at either the first or the second storage devices.

Figure 1:
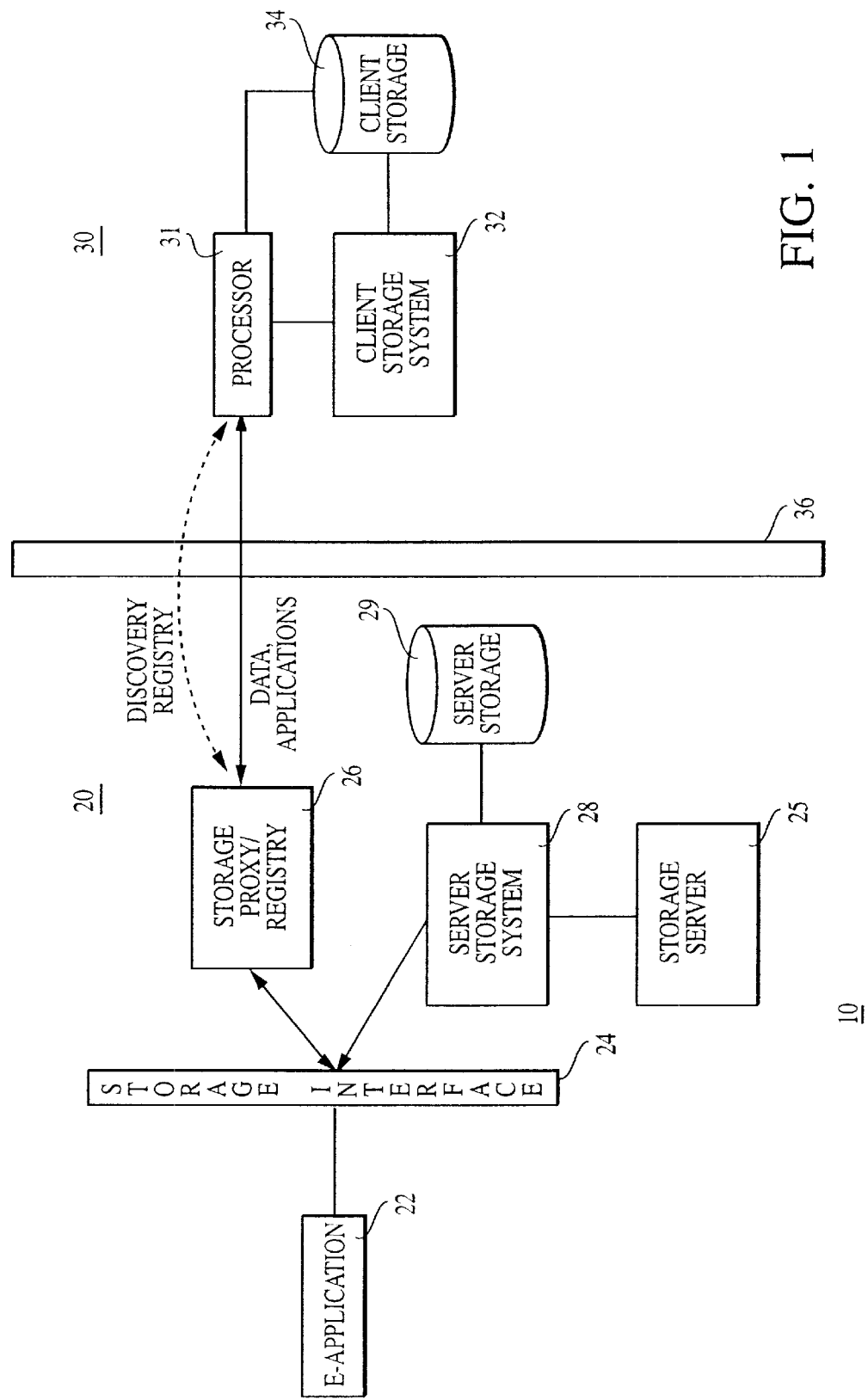
FIG. 1 is a block diagram of a system that unifies data storage in a distributed network.

FIG. 1 is a block diagram of a networked computer system 10 that unifies data storage in a distributed network. The system 10 includes an Internet site 20 and a client 30 connected to the Internet site 20. In FIG. 1, a single Internet site 20 and a single client 30 are shown. However, the system 10 may include multiple Internet sites 20 and multiple clients 30.

The Internet site 20 includes an e-application 22 running on a server 25 at the Internet site 20. The e-application 22 communicates through storage interface 24 with a number of components at the Internet site 20. In particular, the e-application 22 communicates with a server storage system 28 and a storage proxy/registry 26. Coupled to the server storage system 28 is a server storage 29. The server storage system 28 and the storage proxy/registry 26 may be implemented as software programs on the server 25.

The client 30 may include a processor 31, a client storage system 32 and client storage 34. The client storage system 32 communicates with the storage proxy/registry 26 through interface 36.

The server storage 29 may be designed to support normal operation of the e-application 22. That is, when the e-application 22 executes, programming within the e-application may be designed to store any results in the server storage 29, and the server storage 29 may be optimized to store such data. That is, the capacity of the server storage 29 may be chosen so that the e-application 22 is supported for all routine and most non-routine operations. In some cases, operation of the e-application 22 may exceed the capacity of the server storage 29.

The client storage system 32 may be a software program and may be installed on a central processor unit (CPU), or other processor, such as the processor 31. In a typical configuration, the processor 31 may be a personal computer. The client storage 34 may normally store data processed by the processor 31. The client storage system 32 manages allocation of the client storage 34, and acts as an interface between the client storage 34 and the Internet site 20. As will be described later, the client storage system 32 may make some portion of the client storage 34 available to the Internet site 20 so that the Internet site 20 may store data at the client site 30.

Returning to the Internet site 20, the storage proxy/registry 26 communicates with the client storage system 32 to perform functions of storage capacity discovery and registration. Discovery of storage capacity relates to determining how much storage space (megabytes) are available at the client storage 34 for storing data generated during execution of the e-application 22. Registration relates to assigning the storage space at the client storage 34 to store a specific quantity of data.

Discovery of storage capacity can be manual or automatic. Manual discovery may occur when a user of the processor 31 sends information to the storage proxy/registry 26. The user may send the storage capacity information in response to a prompt generated by the e-application 22. For example, the e-application 22 may send a message to the processor 31 indicating that execution of the e-application 22 will result in a potential need for five megabytes of storage at the client storage 34. The message may include an active check box that the user can check to indicate that the storage is available. Checking the block yes tells the e-application 22 that up to five megabytes of data may be "moved" or allocated to the client storage 34. Other manual discovery mechanism may require some form of user-initiated or user-responsive communication between the client site 30 and the Internet site 20. In an embodiment, the e-application 22 may ask for a fixed amount of storage capacity at the client storage 34. The amount of available storage at the client storage 34 may be more or less than the amount requested. If the amount of available storage is more than that requested, the processor 31 may use the excess storage for other purposes. Alternatively, the amount of requested storage is exclusively allocated to the data from the e-application 22, and any excess capacity at the client storage 34 remains unused and unavailable to the processor 31. That is, a memory block in the client storage 34 is exclusively reserved for data from the e-application 22, at least until the user no longer desires to store the data.

If the amount of storage capacity requested at the client storage 34 exceeds the amount available, the storage proxy/registry 26 may allocate the excess capacity to another storage device such as the server storage 29. Alternatively, the e-application 22 may provide a reduced service level to the client site 30, whereby the reduced service level requires less storage capacity than that available at the client site 31. In yet another embodiment, the e-application 22 may generate an error or warning message that is then posted to the processor 31. The warning message may indicate that the e-application 22 cannot proceed unless the user makes more storage available.

Many of the above-described functions of the e-application 22 may alternatively be provided for in the storage proxy/registry 26. In this alternative embodiment, the storage proxy/registry 26 communicates through the storage interface 24 with the e-application 22. Use of the storage interface 24 allows the storage proxy/registry 26 to communicate with a number of different e-applications, and yet provide a consistent method for discovering and allocating data storage.

Automatic storage capacity discovery may be provided in the system 10 by having the storage proxy/registry 26 query the client storage system 32 to report unused storage capacity. The storage proxy/registry 26 may query the client storage system 32 by polling the processor 31. Since the processor 31 presumably knows how much capacity is available, the processor 31 may provide this information to the storage proxy/registry 26 when polled. Besides polling the processor 31, the storage proxy/registry 26 may use other mechanisms for automatic detection of storage capacity.

Use of the storage proxy/registry 26 to "discover" storage capacity allows very different e-applications to interface with the client site 30 and to use a portion of the client storage 34 to store data. By using a separate mechanism of the storage proxy/registry 26, the system 10 may allow protocol messaging between the processor 31 and the server 25 so that transfer of data, and discovery of storage, can occur through any existing firewalls at the client site 30 and the Internet site 20. The storage proxy/registry 26 may also be used to discover storage at the server storage 29 or at other Internet site storage facilities.

The storage proxy/registry 26 also provides the registry function. Registry may be required each time a client site 30 connects to the Internet site 20. That is, because the user's processor 31 may not normally be online on a full time basis, the processor 31 must send a registration to the storage proxy/registry 26 whenever a connection is established. The registration may be automatic, and allows the storage discovery function to proceed.

Figure 2:
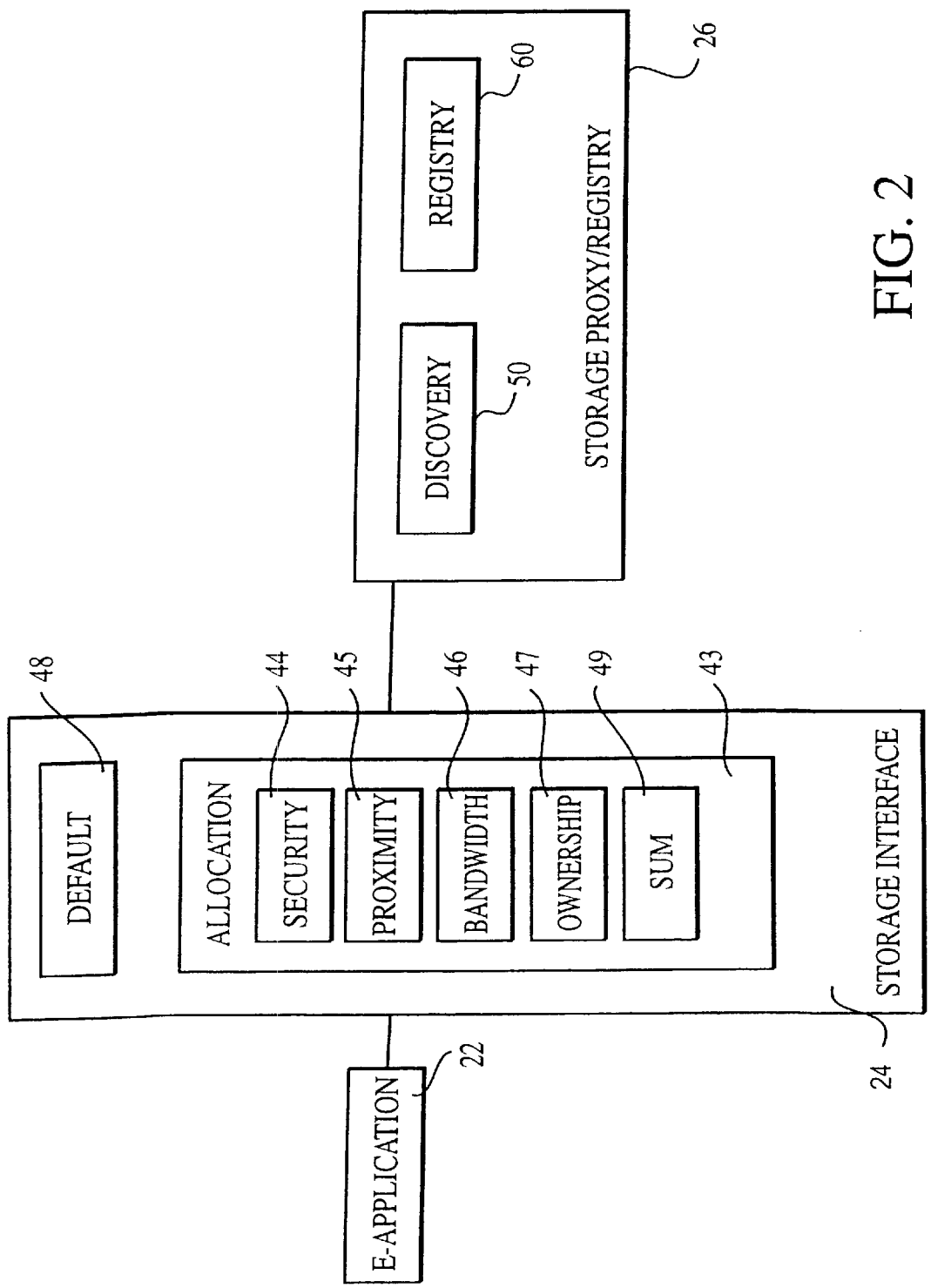
FIG. 2 illustrates a mechanism for allocating data among distributed data storage locations.

As noted above, each e-application, such as the e-application 22, may determine where to allocate storage of data. Alternatively, the storage proxy/registry 26, in conjunction with the e-application 22, may determine where to allocate storage of the data. The storage interface 24, the storage proxy/registry 26, and the e-application 22 are shown in more detail in FIG. 2. The e-application communicates with the storage proxy/registry 26, providing, for example, storage requirements based on routines and programming to be executed by the e-application 22. The storage interface 24 includes a data allocation program 43 that includes the algorithms needed to allocate data among the client storage 34 and the server storage 29. The data allocation program 43 includes a number of filters or routines. These routines include a security routine 44, a proximity routine 45, a bandwidth routine 46, an ownership routine 47, and a summation routine 49. The security routine 44 may determine if the data files to be processed using the e-application 22 are sensitive, or otherwise should be protected from access by unauthorized personnel. In an embodiment, a default setting may be used such that all data files are considered protected. In an alternative embodiment, the client may designate files to be protected. In yet another embodiment, the security routine 44 determines if protection is required based on the existence of a password, public key encryption, or other security measures.

The proximity routine 45 determines a relative measure of proximity of data to the client storage 34 and to the server storage 29. Proximity may be expressed in terms of where the processing is performed. For example, many of the processing routines that comprise the e-application 22 are copied to the client's processor 31, and processing is executed at the processor 31. In this example, the proximity routine 45 would indicate the data and the data storage are in close proximity. The bandwidth routine 46 may examine the connection of the client site 30 to the Internet site 20 to determine the speed at which data will be transferred. The ownership routine 47 determines which entity, the client site 30 or the Internet site 20 "owns" the data. Ownership may be based on a number of factors, including an amount of customization the client may perform using the e-application, or an original source of the data (for example, a digitized image provided by the client would indicate ownership by the client).

The above-described routines may each include a weighting factor that increases or decreases the relative importance of the routines. The summation routine 49 takes the (weighted) results of the routines and determines an overall score. Based on the overall score, data generated as a result of the execution of the e-application 22 is stored at either the server storage 29 or the client storage 34.

Other routines may be incorporated into the e-application 22 or the storage proxy/registry 26 to determine the optimum allocation of data between the server storage 29 and the client storage 34.

The storage interface 24 may also include a default routine 48 that may select a default location for storage of the data. For example, the default routine 48 may specify that for certain routines executed by the e-application 22, storage must be provided at the client site 30. Other default settings may specify that the client site 30 must first be queried to determine if storage is possible. In another embodiment, the system 10 maybe designed such that the data storage is always allocated to the client storage 34. In the event the client storage 34 does not include sufficient capacity to store the data, execution of the e-application 22 may be halted, and an error message may be provided to the processor 31.

The storage proxy/registry 26 includes a storage discovery routine 50. In an embodiment, the storage discovery routine 50 may query the client's processor 31 to ascertain which storage device or destination (e.g., hard drive, optical disk) at the client site 30 is available for data storage, and an amount of storage available at the storage device. The query may be by way of a graphical user interface (GUI), returned to the processor 31, that asks the client to indicate the destination for the data and an amount of data that may be stored at the destination. Other mechanisms may be used to "discover" data storage at the client site 30, including polling the processor 31, and reading available storage at attached storage devices.

Finally, the storage proxy/registry 26 includes a registry routine 60. The registry routine 60 may be used to register a client when the client first accesses the Internet site 22. Because the client is not likely to remain connected to the Internet site 20, the registry routine 60 is used to re-register the client during subsequent connections to the Internet site 20.

A specific application of the system 10 of FIG. 1 will now be described. In this application, the e-application 22 provides processing for an online photo shop that processes images provided by users through client sites such as the client site 30. The online photo shop provides clients the ability to process and enhance digitized images. The digitized images may be images converted from analog sources, such as 35 mm film, and from digital sources, such as images captured by a digital camera. Such digitized images may include defects (e.g., red eye, scratches), loss of color constancy, and other defects. The clients may also want to customize the digitized images, for example, by merging two or more digitized images, posterizing, color conversion, or incorporating a digitized image into a holiday greeting card. The e-application 22 provides clients with the ability to perform these and other image processing and enhancement functions. However, such digitized images typically represent a very large amount of data. One option may be to down-sample the digitized image. The drawback with such down-sampling is that a resulting printed image may lack the sharp edges of the original image, or may otherwise be of a much lower quality. Thus, clients would typically prefer to avoid down-sampling an image. To maintain adequate image quality for printing, large amounts of data storage would ordinarily be required to operate the online photo shop.

As noted above, a typical solution is to use a large data farm for storing the images. To improve on these conventional storage mechanisms, the system 10 of FIG. 1 uses programming in the e-application 22, and programming in the form of the storage interface 24, storage proxy/registry 26, the server storage system 28 and the client storage system 32. The server storage 29 is known by the e-application 22 to exist, thereby ensuring that the e-application 22 may execute its functions, and store any resulting data. However, in operation of the online photo shop, large data files (i.e., digitized photographs and other images) may preferably be stored at a location other than the server storage 29 or at a disk farm. In particular, storage may be preferred at the client storage 34. For example, if a client will create content using the e-application 22, or will generate customized versions of products provided by the e-application 22, storage of the resulting data file preferably maybe at the client storage 34. This philosophy of moving storage to the client's storage facility also reduces the need to provide secure storage at the server storage 29. Put another way, should the client desire to optimize storage security, the client may elect to store any resulting data files at the client storage 34. In this scenario, the client may use an online application, such as the e-application 22, to create or modify content, but would actually store the content at the client storage 34. This storage philosophy also helps reduce file transfer and processing time. In particular, by not having to transfer large data files between the client site 30 and the Internet site 20, the system 10, as embodied by the online photo shop, provides much enhanced processing speed.

In a particular example of using the e-application 22 to enhance a digitized photograph, the e-application 22 may transfer only those programs and algorithms need to perform a specific client request to the client's processor 31. If the client wishes to process a photograph to remove red eye, the e-application may be called on to transfer only the red eye reduction routine to the processor 31. The digital file representing the to-be-enhanced photograph resides on the processor 31, is processed by the processor 31 using the transferred red eye reduction routine, and is then stored in the client storage 34.

In an embodiment, the storage interface 24 and the e-application 22 supporting the online photo shop may use the allocation program 43 (see FIG. 2) to attempt to designate a storage block in the client storage 34. The storage block may be sized to hold an expected, nominal digital image file. For example, the storage block may be five megabytes. The allocation program 43 may be accomplished by presenting the client with a GUI or other interface that asks the client to provide the requested storage using the default routine 48. For example, the GUI could include a text window that states "Continued processing will require 5 Mb storage at your computer. Please designate a drive for the storage." The e-application 22 will continue processing only when the client designates a drive (storage location) for storing both the digital file to be enhanced and the specific routine or algorithm (e.g., the red eye reduction routine) that will perform the desired enhancement. To facilitate storage of data at the client storage 34, the e-application 22 may provide incentives. For example, the e-application 22 may provide for reduced processing fees should the client allow storage at the client storage 34.

In an alternative embodiment, the e-application, in conjunction with the storage proxy register 26, will attempt to "discover" storage for the digitized image file. The storage interface 24 may first attempt to discover storage at the client storage 34 as the preferred storage location, using the storage proxy/registry 26. In another embodiment, the storage proxy/registry 26, in conjunction with the e-application 22 may apply a storage selection algorithm to determine an optimum storage location. As noted above, the storage selection algorithm may include estimating the size of the data file, determining which processing routines may be copied to the processor 31, determining whether the client will "own" the data file, determining proximity of the client to the data file, and estimating the amount of customization requested by the client.

In the above description, the system 10 was employed using an Internet site. However, a similar mechanism may be used in any networked environment. In particular, the method and system for unifying data storage may be used in a local area network, a wide area network, or any other network that links processors, storage and applications.

Figure 3:
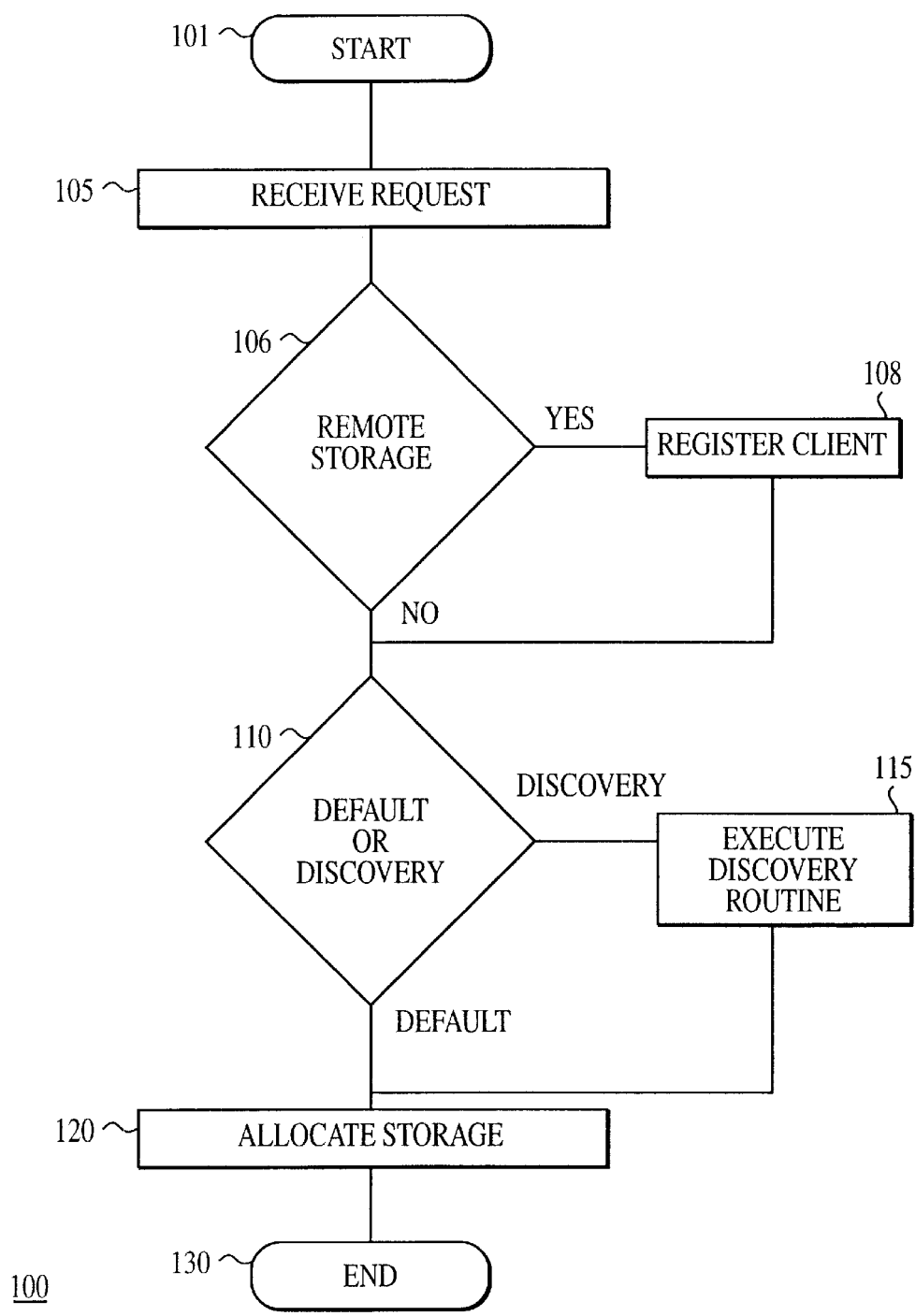
FIG. 3 is a flowchart illustrating an operation to allow for unification of data storage.

FIG. 3 is a flowchart showing execution of a program 100 that unifies data storage. The program 100 may be executed using the various processors and applications shown in the system 10 of FIG. 1. For example, the program 100 may be executed using the storage proxy/registry 26, the server storage system 28 and the e-application 22. The program 100 may be implemented as a software routine and may be contained on a computer-readable storage medium such as a CD-ROM, for example.

The program 100 begins in block 101, and may include forwarding a home page or a GUI to a client listing available routines that may be executed using the e-application 22. For example, a GUI for an online photo shop could be returned to the client listing red eye reduction, scratch removal, sepia toning, color mapping, and other image correction and enhancement features. In block 105, the e-application 22 receives a request from a client to use one or more of the routines of the e-application 22. The request may also indicate a number of images to be processed, along with information about the images such as file size (Mb) and other parameters.

In block 106, the program 100 determines if storage will be allocated to a remote site. If remote storage is to be used, the process moves to block 108. Otherwise, the process moves to block 110. In block 108, the program 100, using the storage proxy/registry 26 attempts to register the client on the system 10. Registration may be needed because clients may not stay connected to the Internet site 20 on a full-time basis. The registration process may also provide enhanced security by incorporating password protection or some form of public key encryption, for example. In block 110, the program 100 determines whether a default storage selection or storage discovery will be used to request storage. The criteria for selecting default storage or storage discovery may include total file size, specific routines selected, and other factors. If default storage at the client storage 34 will be requested, the e-application will forward a request, which may be in the format of a GUI, requesting the client to designate a storage device. The request may also indicate an expected amount of storage capacity.

If storage discovery is selected, the program 100 may execute storage discovery subroutine 115 to determine if storage is available at the client site 30 and/or at the Internet site 20. The program 100 may optionally attempt to discover storage at other sites, such as an Internet web site, that are coupled to the Internet site 20. The discovery requires that block 108 be executed and be successful.

In block 120, the program 100 allocates storage of content (data files, e-application routines) to either the default storage location (e.g., the client storage 34) or to one or more "discovered" storage locations (which may also include the client storage 34).

Returning to storage discovery subroutine 115, the program 100 may first request that all connected storage sites indicate an amount of available storage. This information may be obtained manually from the client storage system 32 by, for example, returning a GUI to be displayed by the processor 31. The GUI may include provisions for entering a storage destination (e.g., drive B) and an allowable amount of storage remaining at the destination. Alternatively, the program 100 may discover storage capacity by polling the client storage system 32 and the server storage system 28. The result of the "discovery" process may be a list of allowable storage locations and a capacity at each of the allowable storage locations. The capacity at a specific storage location may be the actual remaining capacity. Alternatively, the program 100 may incorporate a limitation such that the remaining capacity available for storing data as a result of the e-application execution is capped at a value that likely will not cause the storage location to be filled to capacity. Next, the program 100 may apply various criteria or "filters" to determine where data should be stored among the "discovered" storage locations. In an embodiment, the subroutine 115 includes filters that consider the size (Mb) of the data files, an amount of customization to be performed using a selected e-application routine, proximity of the data to the e-application, bandwidth of the network carrying the data, ownership of the data, and confidentiality criteria. The filters may produce outputs that are summed by a summation subroutine to provide a threshold value. If the threshold value is exceeded, then storage may be required at the client storage 34. Otherwise, storage may be provided at the server storage 29. Alternatively, any of the filter output may be weighted to influence the decision of where to allocate storage. The storage discovery subroutine then ends.

What is claimed is:

1. A method for unifying data storage in a distributed computer network, comprising:

receiving a request from a client site, wherein processing the request produces data to be stored in the network;

applying a default storage selection criteria, wherein satisfaction of the default storage selection criteria results in storage of the data at a default storage location; and when the default storage selection criteria is not satisfied, applying a storage discovery routine, wherein storage discovered by the storage discovery routine is used to store the data, and wherein the storage discovery routine, comprises:

providing a data storage request to the client site, receiving a response to the request, applying one or more data storage selection filters to the response, generating a storage selection parameter based on the applying step, and selecting a storage device based on a value of the storage selection parameter.

2. The method of claim 1, wherein the default storage location is at the client site.

3. The method of claim 1, wherein the default storage location is a remote site coupled to the network.

4. The method of claim 1, wherein the request is made by way of a graphical user interface, and wherein the response is provided manually by a client at the client site.

5. The method of claim 1, wherein the request is a polling request that accesses available storage capacity of storage devices at the client site.

6. The method of claim 5, wherein the response is a list of available storage devices and available storage capacity at one or more of the available storage devices.

7. The method of claim 1, wherein the selecting step comprises comparing the value of the storage selection parameter to a threshold value.

8. The method of claim 1, further comprising weighting one or more outputs of the filters.

9. The method of claim 1, wherein the storage selection parameter comprises a sum of the outputs of the filters.

10. The method of claim 1, wherein the filters comprise a proximity filter, a security filter, an ownership filter, and a bandwidth filter.

11. A system that unifies data storage in a networked computer environment, wherein one or more client sites are coupled to the networked computer environment, the system comprising:
   an application that resides at a server site in the networked computer environment;
   a storage proxy/registry at the server site, wherein the storage proxy/registry comprises:
      a storage discovery routine, wherein storage is discovered at one or more of the sever site, a client site, or another server site in the networked computer environment, and
      a storage allocation routine that allocates storage of the data among discovered storage locations;
   a server storage system at the server site; and
   a server storage, wherein the storage proxy/registry determines a storage location for data processed using the application.

12. The system of claim 11, wherein the storage allocation routine, comprises:
   a data proximity routine;
   a data security routine;
   a data ownership routine; and
   a data bandwidth routine.

13. The system of claim 11, further comprising a data storage default routine, wherein the default routine assigns data storage to a specific site in the networked computer environment.

14. A computer-readable storage medium comprising instructions for discovering and allocating storage in a distributed computer network, the instructions, comprising:
   receiving a request from a client site, wherein processing the request produces data to be stored in the network;
   applying a default storage selection criteria, wherein satisfaction of the default storage selection criteria results in storage of the data at a default storage location; and
   when the default storage selection criteria is not satisfied,
      applying a storage discovery routine, wherein storage discovered by the storage discovery routine is used to store the data, and wherein discovery routine comprises:
         providing a data storage request to the client site,
         receiving a response to the request,
         designating storage at the client site based on the response,
         applying one or more data storage selection filters to the response,
         generating a storage selection parameter based on the applying step, and
         selecting a storage device based on a value of the storage selection parameter.

15. The computer-readable storage medium of claim 14, wherein the default storage location is at the client site.

16. The computer-readable storage medium of claim 14, wherein the default storage location is a remote site coupled to the network.

17. The computer-readable storage medium of claim 14, wherein the selecting step comprises comparing the value of the storage selection parameter to a threshold value.

18. The computer-readable storage medium of claim 14, the instructions further comprising weighting one or more outputs of the filters.

19. The computer-readable storage medium of claim 14, wherein the storage selection parameter comprises a sum of the outputs of the filters.

20. The computer-readable storage medium of claim 14, wherein the filters comprise a proximity filter, a security filter, an ownership filter, and a bandwidth filter.

* * * * *